United States Patent [19]
Urano

[11] 3,864,706
[45] Feb. 4, 1975

[54] MULTIPLE EXPOSURE STRUCTURE FOR CAMERAS
[75] Inventor: Fumio Urano, Wako, Japan
[73] Assignee: Asahi Kogaku Kogyo Kabushiki Kaisha, Tokyo-to, Japan
[22] Filed: July 26, 1973
[21] Appl. No.: 382,878

[30] Foreign Application Priority Data
July 28, 1972 Japan.............................. 47-75148

[52] U.S. Cl. ............................................. 354/209
[51] Int. Cl. ......................................... G03b 19/04
[58] Field of Search ........... 95/31 R, 31 AC, 31 FL, 95/31 FM; 354/209

[56] References Cited
UNITED STATES PATENTS
| | | | |
|---|---|---|---|
| 3,608,459 | 9/1971 | Ettischer et al. | 95/31 FM UX |
| 3,641,899 | 2/1972 | Tsuruoka | 95/31 AC X |
| 3,650,191 | 3/1972 | Nomura et al. | 95/31 AC X |

Primary Examiner—Fred L. Braun
Assistant Examiner—Kenneth C. Hutchison
Attorney, Agent, or Firm—Steinberg & Blake

[57] ABSTRACT
A camera which ordinarily prevents double exposures but which includes structure to permit a second exposure only if the film has not been advanced by any fraction of a frame length after a first exposure. A film transporting structure is driven from a transmission through a clutch which is disengaged to prevent operation of the film transporting structure. The transmission also operates a take-up spool which remains stationary, when blocked by a blocking structure, while the transmission continues to operate. A manually operable structure (button) normally has a rest position at which the blocking structure is in a non-blocking position and the clutch between the transmission and the film transporting structure is engaged. This manually operable structure can be displaced from its rest position to a rewind position at which only the clutch is placed in its disengaged position so that at this time exposed film can be rewound. The manually operable structure also has a multiple exposure position where the clutch is also disengaged and where the blocking structure is in a blocking position, so that at this time a shutter can be cocked when the transmission is operated, while the film will remain stationary so that a multiple exposure can be made. A pivotable safety lever extends into the path of the button. It prevents the button from being depressed to move the blocking member, except when displaced by a cam on the film takeup shaft at intervals of one full frame length. This safety structure insures that double exposures are made in registry.

9 Claims, 4 Drawing Figures

MULTIPLE EXPOSURE STRUCTURE FOR CAMERAS

BACKGROUND OF THE INVENTION

The present invention relates to cameras.

More particularly, the present invention relates to cameras which are constructed so as to be capable of making intentional multiple exposures.

There are known conventional devices of the above type where a clutch is provided between a film-transporting sprocket and a transmission for driving the sprocket while a second clutch is provided between a take-up spool and a shaft of the transmission for driving the sprocket. An operating structure is accessible to the operator at the exterior of the camera for disengaging both of these clutches when it is desired to make an intentional multiple exposure.

While with a construction of this type it is theoretically possible to disengage both of the above clutches when it is desired to make a multiple exposure, experience has demonstrated that as a practical matter the film frame at the exposure position does not reliably remain stationary after the first exposure thereof with a construction of the above type. As a result, in order to make certain that the film does not move when both of the clutches are disengaged and the shutter is cocked, it is conventional for the operator to lift the rewind crank at the top of the camera and to rewind film which is loosely wound in the film cartridge so that the film will be in a taut condition having no slack therein when it is desired to make a multiple exposure. Thus, with such a construction the operator will manually hold the rewind crank, being assured that the film is tight, and then the clutches are disengaged and the shutter is cocked while the transmission for transporting film is simultaneously operated without actually transporting film because of the disengagement of the clutches. In this way it is possible with such a conventional construction to make a second or additional exposures on an already exposed film frame with an assurance that there has been no displacement of the film from the exposure position.

It is also possible to make multiple exposures with cameras of the self-cocking type where there is no clutch between the take-up spool and the transmission for operating the film-transporting sprocket. With a camera of this type also the operator first turns the rewind crank to the rewind position and operates the latter to tightly wind any loose film which is present in the cartridge, and with the crank held in the position maintaining the film taut, after the first exposure has been completed the operator will manipulate the rewind button so that the transportation of the film will not be performed during cocking of the shutter, with the rewind crank of course still being held by the operator at this time, so that in this way also it is possible to make more than one exposure of the same film frame without risking movement of the film from the position it had when initially exposed. However, even with such a construction there is a risk of film displacement because of a frictional drive established between the take-up spool and a transmission shaft.

As is clear from the above, it is essential when making multiple exposures that the film remain stationary while the shutter is cocked. This requirement is theoretically fulfilled by the former of the above types of constructions where there are a pair of clutches respectively at the film spool and sprocket. However, the requirement of a special clutch at the take-up spool has considerable disadvantage in that the rotary force of the spool is undesirably affected by the clutch structure during operation of the film-transporting lever and the assembly of the structure is troublesome so that the construction cannot be manufactured economically since particular complications are involved with the special clutch structure at the film spool. With the second of the above types of constructions there is the disadvantage that undesirable movement of the film occurs, unless an exceedingly skillful manipulation is carried out by the operator in connection with multiple exposures.

SUMMARY OF THE INVENTION

It is accordingly a primary object of the present invention to provide a construction which will avoid the above drawbacks.

Thus, it is a primary object of the present invention to provide a construction which makes it possible in an extremely convenient manner to carry out multiple exposures without any possibility of displacement of the film.

Moreover, it is a particular object of the present invention to provide a construction according to which it is not possible to make a multiple exposure except at a time when one complete film frame has been moved and the next film frame has not yet started to move so that it is not possible to make a multiple exposure which overlaps a pair of successive film frames.

Yet another object of the present invention is to provide a construction which is rugged in the sense of resisting injury in the case where an operator attempts to make a multiple exposure at a time when such a multiple exposure would be improper, such as when a film frame has only moved part of the way from an exposure position toward a take-up spool so that the next film frame has not been completely transported to the exposure position.

A further object of the present invention is to provide a construction of the above type which lends itself to convenient incorporation into camera structures which are conventional except for the additional structure of the invention for making the multiple exposures.

Also it is an object of the invention to provide a structure of this type which is simple and compact so that there is no problem in adding the structure of the invention to cameras where space is at a premium.

In accordance with the invention the camera includes a film-transporting means and a transmission means for transmitting movement to the film transporting means. A clutch means is operatively connected between the transmission means and the film transporting means and has an engaged position for transmitting movement between the transmission means and film transporting means and a disengaged position for preventing transmission of movement from the transmission means to the film transporting means. A take-up spool means is provided for taking up exposed film, and a connecting means connects the transmission means to the take-up spool means for turning the latter except when the take-up spool means is blocked against movement. A blocking means has a non-blocking position freeing the spool means to be turned by the transmission means and a blocking position engaging the spool means to block the latter against movement when the transmission means operates. A manually operable means has a rest position at which the blocking means is in its non-blocking position and a clutch means is in its engaged position. This manually operable means can be displaced by the operator to a rewind position cooperating with the clutch means to place the latter in its disengaged position while the blocking means still remains in its non-blocking position, so that at this time film can be rewound. The manually operable means also has a multiple exposure position cooperating both with the blocking means and the clutch means to place the blocking means in its blocking position and the clutch means in its disengaged position so that in this multiple exposure position of the manually operable means the transmission means may be operated simultaneously with cocking of the shutter without transporting film.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
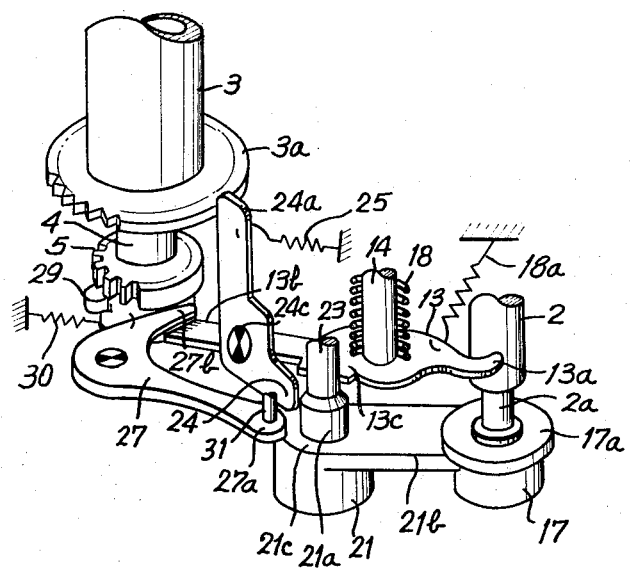
FIG. 1 is a perspective illustration of one possible embodiment of a structure according to the invention.

Referring to the drawings, there is illustrated therein a blocking means formed by a lever 24 which has the configuration of a substantially L-shaped plate. This blocking means formed by the lever 24 is supported for pivotal movement on a pivot 24c carried by a lug or tongue 19a which is struck and bent from a portion of a stationary plate 19 of the camera, this plate 19 forming part of a supporting framework of the camera so that it forms a support means which supports the blocking means 24 for swinging movement about the pivot 24c. This blocking means 24 has a blocking end 24a which is adapted to engage a flange 3a of a take-up spool 3 in order to block the latter against movement, the flange 3a terminating at its outer periphery in a series of teeth which define between themselves notches one of which will receive the end 24a of the blocking means 24 when the latter is in its blocking position. The opposed end 24b of the blocking means 24 engages an upwardly directed surface 21c of a multiple exposure member 21 which forms part of a manually operable means.

Figure 2:
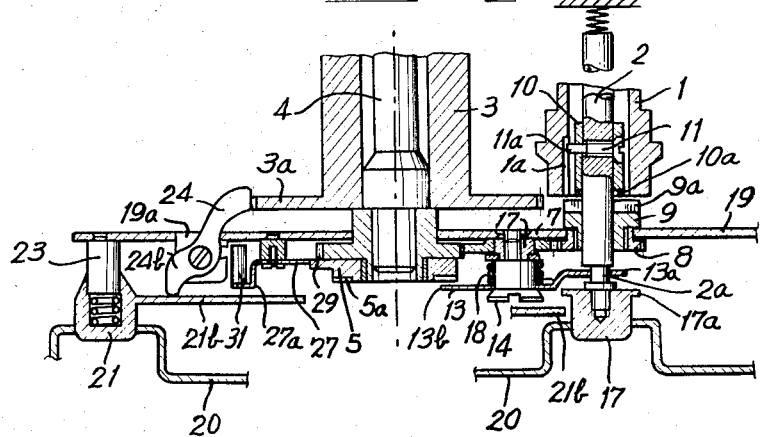
FIG. 2 is a sectional elevation taken in a vertical plane which includes the axes of a take-up spool and a film-transporting sprocket, the structure being shown at the left side of the spool center line in FIG. 2 in a position where a blocking means is in a blocking position and at the right side of the latter center line in FIG. 2 in a position where only a clutch is disengaged so that film can be rewound.

The support means formed by the plate 19 fixedly carries a stationary downwardly directed pin 23 which extends from the stationary frame plate 19 toward the exterior bottom wall 20 of the camera. This bottom wall 20 is formed at the interior of a depression thereof with an opening through which the botton 21 freely extends. The hollow button 21, as shown at the lower left of FIG. 2, is slidable on the pin 23 and houses in its interior a spring which urges the button 21 downwardly to an outer rest position. In addition it will be noted, as shown schematically in FIG. 1, that a spring 25 is operatively connected with the lever 24 to urge the latter in a clockwise direction, as viewed in FIG. 1, where the lower end 24b of the lever 24 presses against the upper surface 21c of the manually operable means. Of course, the multiple exposure member 21 may take the form of a suitable handle rather than a button as illustrated. This multiple exposure member 21 has integrally fixed therewith an elongated extension 21b, for a purpose referred to below, and the inner portion of the hollow button 21 which surrounds the pin 23 includes the tubular portion 21a which has an inclined end surface as illustrated. This portion 21a of the multiple exposure member 21 with its inclined end surface is adapted to cooperate with an extension 13c of a retaining means 13 in the form of a lever which is swingable on a pin 14 carried by the support means 19, this pin 14 being schematically illustrated in FIG. 1 and being shown at the right of the center line of FIG. 2.

The manually operable means includes in addition to the multiple exposure member 21 a rewind member 17 which is also in the form of a button guided for movement through an opening in the bottom wall 20 of the camera, this bottom wall being formed with a second depression at the inner part of which is located the opening through which the button 17 extends as shown at the lower right portion of FIG. 2. The end of the integral extension 21b of the multiple exposure member 21 which is distant from the guide pin 23 terminates in an arcuate edge situated behind a flange 17a extending outwardly from the button 17 at its inner end. The button 21 is shown in FIG. 2 in a position which it takes when pushed in so as to swing the blocking means 24 to its blocking position while the end of the extension 21b which is illustrated in FIG. 2 at the right side of the center line is shown at the elevation it has when the multiple exposure member 21 is in its rest position. On the other hand, the member 17 which forms a rewind member of the manually operable means is illustrated at the lower right of FIG. 2 in a position it takes when pushed upwardly for disengaging a clutch, as described below, so that for this reason the flange 17a is shown in FIG. 2 spaced upwardly from the free end of extension 21b which is situated beneath the flange 17a. Normally this flange 17a is situated directly above and even in engagement with the free end of the extension 21b, so that with this arrangement the multiple exposure member 21, when displaced by the operator, will also displace the rewind member 17, while on the other hand, the rewind member 17 can be displaced to the position shown at the lower right of FIG. 2 without actuating the multiple exposure member 21. The spring housed within the hollow button 21 normally maintains the latter in its lower rest position where the extension 21b is situated at the elevation shown for the free end portion thereof schematically indicated at the lower right of FIG. 2.

The film transporting means includes a rotary hollow sprocket 1, as is well known, this hollow sprocket 1 housing in its interior an elongated vertically extending shaft 2 which has just above the button 17 a constricted portion 2a in the form of a part of a shaft 2 which is of a smaller diameter than the remainder thereof and which defines with the remainder of the shaft a downwardly directed shoulder beneath which the retaining lever 13 is adapted to be located in a manner described below. Thus the retaining means formed by the lever 13 terminates in a right free end portion 13a, as viewed in FIGS. 1 and 2, and this right free end portion 13a is adapted to engage the constricted portion 2a of the shaft 2, thus becoming located beneath the shoulder where the portion 2a joins the remainder of the shaft 2, so that a spring which is illustrated schematically at the upper right portion of FIG. 2 cannot return the shaft 2 to its lower rest position, together with the button 17, until the retaining means 13 is displaced out of its position next to the constricted portion 2a of the shaft 2.

As was pointed out above, the lever 13 which forms the retaining means is supported for swinging movement on a stationary pin 14, and a coil spring 18 surrounds the pin 14 and urges the lever 13 downwardly to a position engaging the lower head end of the pin 14, as is particularly apparent from FIG. 2. As is shown schematically in FIG. 1, a spring 18a engages the lever 13 so as to urge the end 13a thereof toward the axis of the shaft 2. Thus, as a result of the action of the spring 18a, when the rewind member 17 is pushed upwardly by the operator the constricted portion 2a of the shaft 2 will reach the elevation of the end 13a of the retaining lever 13 so that the latter will be turned by the spring 18a to a position engaging the constricted portion 2a and thus preventing temporarily return of the shaft 2 and the member 17 to their normal positions.

The shaft 2 in the interior of the hollow film-transporting means 1 fixedly carries a clutch member 10 which at its lower end has a pair of diametrically opposed projections 10a adapted to enter into a recess 9a extending across the upper surface of a gear 9 which is supported for rotary movement on the plate 19 and through which the shaft 2 passes so as to be freely turnable with respect to the gear 9 so that the latter can turn freely with respect to the shaft 2. The clutch member 10 is fixed to the shaft 2 by way of a screw 11 which passes transversely through the shaft 2 and the clutch member 10 and which terminates in a free end 11a received in a longitudinal groove 1a which is formed in the interior of the hollow sprocket 1. Thus, when the projections 10a of the clutch member 10 are in the recess 9a, the rotary movement of the gear 9 will be transmitted to the sprocket 1. On the other hand, when the projections 10a are situated upwardly beyond the recess 9a, rotary movement of the gear 9 will not be transmitted to the shaft 2, so that at this time the film transport means 1 will remain stationary even though the gear 9 rotates. Therefore, when the rewind member 17 is pushed upwardly, the clutch means 10 is necessarily moved from its engaged to its disengaged position, so that the transmission of rotary movement to the film-transporting means 1 is interrupted at this time. The gear 9 forms part of a transmission which includes the peripheral gear teeth 8 of the gear 9, the rotary gear 7 meshing therewith and supported for rotary movement on the pin 14, and the gear 6 (FIGS. 3 and 4) is supported for rotary movement on a pin 16 also carried by the plate 19 and meshes with the gear 7, this gear 6 in turn meshing with a gear 5 fixed to the lower end of a rotary shaft 4 which extends coaxially along the interior of the hollow take-up spool 3. This shaft 4 is turned by the operator simultaneously with cocking of the shutter, so that when the shutter is cocked the transmission means formed by the above train of gears will turn the film-transport means 1 in order to transport film to the take-up spool 3 simultaneously with cocking of the shutter.

A connecting means is provided for connecting the shaft 4 to the spool 3 in such a way that the latter will turn with the shaft 4 except when the spool 3 is blocked by the blocking means 24 against rotary movement. This connecting means takes the form of enlarged portions of the shaft 4, one of which is shown at the lower end thereof just above the gear 5 in FIG. 2, having outer surfaces frictionally engaging the inner surface of the spool 3. Thus, when the blocking means 24 is in a non-blocking position where it does not engage the flange 3a at the lower end of the spool 3, the spool 3 will turn together with the shaft 4, while when the blocking means 24 engages the flange 3a, the spool 3 will be maintained stationary while the shaft 4 can turn in the interior thereof.

Figure 3:
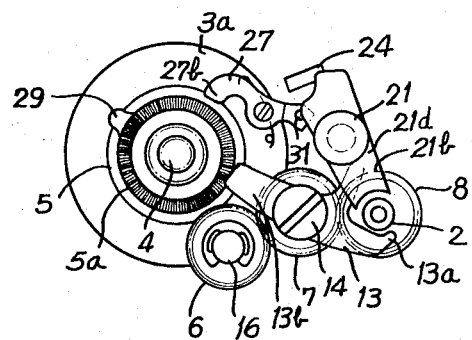
FIG. 3 is a plan view of the structure of FIG. 1 as seen from below, illustrating the parts in a position where a multiple exposure cannot be made.
Figure 4:
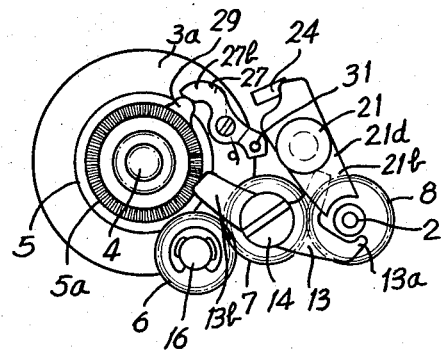
FIG. 4 shows the parts of FIG. 3 in a position which they take when a multiple exposure can be made.

As is well known, the transmission means 4–9 is operated through one cycle during which a single film frame is transported, and then the next film frame is normally transported during the next operating cycle of this transmission means 4–9. A safety means is provided to prevent the manually operable means 17, 21 from being placed in its multiple exposure position except at the end of one opening cycle of the transmission means when a complete film frame has been transported and the starting of the transporting of the next film frame has not yet taken place. This safety means includes a movable plate or lever 27 which in the illustrated example is supported for turning movement by a pivot pin carried by the support means formed by the plate 19. This safety plate or lever 27 has an end 27a which normally is situated between the surface 21c of the multiple exposure member 21 and the support means 19. Therefore as long as the safety plate or lever 27 overlaps the multiple exposure member 21 so as to be situated between the latter and the support means 19, the multiple exposure member 21 cannot be displaced toward the support means 19 to an extent sufficient to locate the blocking means 24 in its blocking position. FIGS. 3 and 4 schematically illustrate a spring extending around an edge of the lever 27 so as to locate the latter in its normal position overlapping part of the surface 21c, as illustrated in FIG. 3. The transmission means 4–9 includes a cam mesh 29 fixed to the gear 5 so as to rotate therewith. This cam means 29 engages the end 27b of the lever 27 at the end of an operating cycle of the transmission means when a complete film frame has been displaced. Thus, as is schematically shown in FIG. 1, the spring 30 normally urges the lever 27 in a counterclockwise direction to locate the end 27a thereof over the surface 21c. However, at the end of an operating cycle of the transmission means the cam 29 engages the end 27b of the lever 27 to displace the end 27a of the plate or lever 27 away from the space between the surface 21c and the support means 19, so that at this position of the parts, as illustrated in FIG. 4, the multiple exposure member 21 can be freely displaced toward the support means 19 to situate the lever 24 in its blocking position. The spring 30 normally maintains the end 27b of the lever 27 against an extension of the gear 5 which carries the cam 29, at the elevation of this cam 29 so that the end 27b is in the path of turning of the cam 29.

The end 27a of the lever 27 carries a pin 31 extending from the end 27a toward the plate 19 so as to prevent any deformation of other injury to the plate 27 if the operator should attempt to push the member 21 toward the support means 19 at a time when the end 27a overlaps the surface 21c of the multiple exposure member.

With this construction when the cam means 29 engages the end 27b of the swingable plate or lever 27, the opposed end 27a thereof is displaced from its overlapping relationship with respect to the surface 21c, so that the multiple exposure member 21 can readily be pushed by the operator toward the support means 19. For this purpose the cam 29 is fixed with the gear 5 directly on the shaft 4 so as to rotate therewith, the annular position of the cam 29 being such that it engages the end 27b when an operating cycle of the transmission means 4-9 has been completed with the end of the transportation of a single frame frame.

The gear 5 of the transmission means is provided at its bottom surface with a series of teeth 5a situated at the elevation of the end 13b of the retaining means formed by the retaining lever 13 so that the end 13b of the lever 13 which is swingably mounted on the pin 14 can be brought into engagement with the teeth 5a. Of course the pin 14 is fixedly carried by the support means formed by the plate 19. As was pointed out above, the free end of the extension 21b which is integral with and forms part of the multiple exposure member 21 is curved so as to form part of a circle and is at all times situated beneath part of the flange 17a, so that while the rewind member 17 can be moved independently of the multiple exposure member 21, when the latter is moved by the operator the free end of the extension 21b necessarily engages the flange 17a so as to displace the rewind member 17 simultaneously with the multiple exposure member 21.

As was indicated above, the inner surface of the sprocket 1 is formed with an axial groove 1a receiving the free end 11a of the screw 11 which fixes the clutch 10 to the shaft 2. The tongue or lug 19a which is struck from the base plate 19 carries the pivot pin 24c on which the blocking means 24 is mounted. As was pointed out above, the spring 18 surrounds the pin 14 and acts on the upper surface of the retaining means 13. Also, the bottom wall 20 of the camera is fragmentarily illustrated in FIG. 2.

The above-mentioned structure of the invention operates in the following manner:

Assuming that a film frame has been exposed in a conventional manner, it is possible to carry out a multiple exposure with the structure of the invention by pushing the multiple exposure member 21 upwardly and then operating the film transport lever which is accessible at the top of the camera, as is well known. In this position of the parts, since the film frame which has been exposed once in the normal way has arrived at the exposure position due to the completion of an operating cycle of the transmission means 4-9, the projection 29 engages the end 27b of the safety means 27, with the parts at this time having the position shown in FIG. 4. In other words the lever 27 has been displaced by the cam 29 in opposition to the spring 30 to the location where it is no longer in overlapping relationship with respect to the surface 21c. During the upward pushing of the multiple exposure member 21 by the operator, as by application of the pressure of a fingertip to the button 21, the blocking means 24 is turned in opposition to the spring 25 so that the end 24a of the blocking lever 24 comes into engagement with the flange 3a at a notch between a pair of teeth at the periphery thereof. Thus, the upward movement of the member 21 causes the surface 21c thereof to engage the lower end of the lever 24 so as to turn the latter, this lower end of the lever 24 at all times being located over the surface 21c. Simultaneously, the free end of the extension 21b engages the flange 17a of the rewind member 17 to displace the latter upwardly. In this way the shaft 2 and the clutch 10 carried thereby are displaced upwardly so that the clutch means for transmitting movement from the transmission means 4-9 to the sprocket 1 is automatically placed in its disengaged position simultaneously with the blocking of the spool 3 against turning movement.

When the rewind member 17 is pushed by itself upwardly to disengage the clutch means 10, the retaining means 13 will be turned by the spring 18a, shown schematically in FIG. 1, so that the free end 13a thereof engages the constricted portion 2a of the shaft 2, in order to retain the latter in its upper position with the clutch means disengaged even when the operator releases the rewind member 17. However, when the multiple exposure member 21 is pushed upwardly by the operator, the part 21a thereof which surrounds and slides along the pin 23 engages the extension 13c of the lever 13 so that the latter is pushed upwardly along the pin 14 in opposition to the spring 18, and this upward movement of the retaining means 13 simultaneously with the upward movement of the multiple exposure member 21 prevents the end 13a from reaching the constricted portion 2a of the shaft 2, so that the retaining means 13 is prevented from assuming its retaining position when the multiple exposure member 21 is pushed upwardly by the operator.

Thus, in the multiple exposure position of the manually operable means which includes the members 17 and 21, the clutch means 10 is disengaged and the blocking means 24 is in its blocking position, so that the sprocket 1 will not be turned when the transmission means 4-9 is operated and the spool 3 will not be turned when the shaft 4 is rotated. Therefore, when the film transport lever is turned the film will remain absolutely stationary, and only the shutter will be cocked, so that during the next tripping of the shutter a multiple exposure will be made. Once the shutter is cocked the operator releases the multiple exposure member 21 so that it returns automatically to its initial position, thus permitting the blocking means 24 to be returned by the spring 25 to the non-blocking position and also permitting the clutch means 10 to again assume its engaged position. Thus, all of the parts are again in their initial positions so that the conventional operations can go forward. Naturally, it is possible to make three or more exposures on the same film frame simply by repeating the above procedures.

Assuming that it is only desired to rewind exposed film, then the operator will only push the rewind member 17 upwardly with the result that the projections 10a of the clutch 10 are displaced together with the shaft 2 so that these projections move out of the recess 9a, so that the clutch means is placed in its disengaged position. It will be noted that at this time the blocking means 24 remains in its non-blocking position. Since the multiple exposure member 21 is not moved upwardly at this time, the retaining means 13 is not displaced upwardly, and therefore when the shaft 2 is moved up the free end 13a of the lever 13 can be turned by the spring 18a into the space surrounding the constricted portion 2a, so that in this way the retaining lever 13 assumes its retaining position beneath the shoulder of the shaft 2, as pointed out above. In other words, at this time the portion 21a of the member 21 will not engage the extension 13c of the lever 13 to displace the latter along the pin 14, so that the retaining means 13 is free to operate at this time in order to retain the clutch means in its disengaged position to permit the rewinding operations to go forward, even if the operator should release the rewind member 17 after it has once been pushed upwardly. The swinging of the retaining lever 13 by the spring 18a to the retaining position places the free end 13b of the retaining lever 13 in engagement with the drive surface formed by the teeth 5a of the gear 5, and this is the position of the parts during rewinding of the film. Thus, at this time the film cartridge spool is turned in a reverse direction and the sprocket 1 freely turns during the reverse movement of the film back into the cartridge. The spool 3 turns on the shaft 4 at this time due to the frictional engagement therewith as pointed out above.

At any time when the operator again turns the film transport lever to cock the shutter and advance film toward the spool 3, the rotation of the gear 5 will cause the teeth 5a thereof to swing the lever 13, by engaging the end 13b thereof, in opposition to the spring 18a to a position displacing the retaining end 13a of the lever 13 outwardly away from the shaft 2 so that the spring shown schematically at the top of the shaft 2 in FIG. 2 will now automatically lower the shaft 2, returning the rewind member 17 to its initial position and causing the clutch means to become engaged.

Thus, with the above structure of the invention multiple exposures may be intentionally made without in any way interfering with the correct operation of the camera. All that is required is for the operator to push the multiple exposure member 21 upwardly, this member 21 being freely accessible at the bottom of the camera. As was pointed out above, when the member 21 is pushed upwardly transportation of the film is reliably prevented. Accordingly, if it should happen that the member 21 is erroneously pushed upwardly when a film transporting operation has not yet been completed, the completion of the film transportation will of course be prevented. As a result, a complete film frame will not be transported, and if the next exposure is then made, this exposure will overlap part of the previously exposed frame. Such a possible operation would of course be considered a disadvantage of an arrangement having the multiple exposure member 21 as described above.

However, in accordance with the present invention, this latter disadvantage is effectively avoided by way of the safety means 27. In the event that a complete operating cycle of the transmission means 4–9 has been carried out, the cam 29 will reliably locate the safety lever 27 in a position where it does not block movement of the multiple exposure member 21. However, if it should happen that only part of a frame has been transported so that the cycle of operation of the transmission means has not been completed, with the parts, for example, in the position shown in FIG. 3, then at this time the cam 29 will necessarily be out of contact with the safety lever 27 so that the end portion 27a thereof, which carries the protecting pin 31, necessarily overlaps the surface 21c at this time, and thus the operator cannot push the button 21 upwardly at this time to make a multiple exposure. Thus, unless a complete frame has been transported, the multiple exposure member 21 cannot be operated to effect a multiple exposure. In this way erroneous operation of the multiple exposure member 21 at an improper time is reliably prevented, even if the member 21 is accessible at the bottom of the camera where the operator is likely to push the member 21 upwardly at an improper time.

Therefore, with the present invention it is possible to make multiple exposures without any possible movement of the film in a highly convenient manner. In contrast, with previously known structures designed to accomplish similar results, the operation of the film transport lever to cock the shutter will have an undesirable influence on the sprocket and thus these conventional constructions are accompanied by the risk that film displacement will occur even if it is intended that the film transporting sprocket remain idle by disengagement of the clutch. In contrast, with the structure of the present invention the take-up spool 3 is itself blocked against movement when making a multiple exposure, even when the shaft 4 rotates during turning of the film transport lever to cock the shutter, and thus the spool 3 is reliably maintained stationary so that displacement of film is positively blocked in a highly effective manner.

In addition, the operation of only the multiple exposure member 21 brings about simultaneous operation of the rewind member 17 so that the structure of the invention is extremely convenient to operate and in addition the entire construction is considerably simplified so that it is far more economical than previously known constructions.

In addition, as pointed out above, the safety lever 27 and the mechanism associated therewith for preventing erroneous operation of the multiple exposure member 21 is a simple and highly effective means for blocking the member 21 against movement at any time except when a multiple exposure can properly be made. As a result it is possible to situate the structure of the invention at a location where improper accidental operation need not be feared.

While in the preferred embodiment of the invention described above the manually operable means includes the rewind member 17 and the multiple exposure member 21 which are in the form of separate members, it is also possible to provide in accordance with the invention a construction according to which the members 17 and 21 are combined into a single member. Such a single member may be operated in such a way that during its initial increment of movement the clutch means 10 is disengaged so that rewinding operations can be carried out, whereas a further movement of such a single member beyond the initial increment required for rewinding will result in maintaining the clutch means in its disengaged position and in turning of the blocking means 24 to assume its blocking position, so that a full movement of such a single member will enable multiple exposures to be made while a partial movement through an initial increment will enable rewinding operations to be carried out.

What is claimed is:

1. In a camera, film-transporting means, transmission means for transmitting movement to said film-transporting means, clutch means operatively connected between said transmission means and film-transporting means and having an engaged position for transmitting movement between said transmission means and film-transporting means and a disengaged position for preventing transmission of movement from said transmission means to said film-transporting means, take-up spool means for taking up exposed film, connecting means connecting said transmission means to said spool means for turning the latter except when said spool means is blocked against movement, blocking means having a non-blocking position freeing said spool means to be turned by said transmission means and a blocking position engaging said spool means to block the latter against movement when said transmission means operates, and manually operable means having a rest position at which said blocking means is in said non-blocking position thereof and said clutch means is in said engaged position thereof, said manually operable means having a rewind position cooperating with said clutch means for placing the latter in said disengaged position thereof while said blocking means still remains in said non-blocking position thereof, and said manually operable means having a multiple exposure position cooperating both with said blocking means and said clutch means for placing said blocking means in said blocking position thereof and said clutch means in said disengaged position thereof so that in said multiple exposure position of said manually operable means said transmission means may be operated simultaneously with cocking of a shutter of the camera without transporting film while when said manually operable means is in said rewind position thereof film may be rewound from said take-up spool back into a film cartridge, said transmission means acting through said clutch means, when the latter is engaged, on said film-transporting means for transporting film frame-by-frame during successive operating cycles of said transmission means, respectively, and safety means cooperating with said manually operable means for preventing the latter from assuming said multiple exposure position except at the end of one complete operating cycle of said transmission means when transportation of a complete frame has been completed and the next operating cycle for transporting the next film frame has not yet started.

2. The combination of claim 1 and wherein said safety means cooperates with manually operable means to permit the latter to assume said rewind position without being influenced by said safety means.

3. The combination of claim 1 and wherein said manually operable means includes a pair of manually engageable members accessible to the operator for manual movement, one of said members being a rewind member operatively connected with said clutch means for displacing the latter from said engaged to said disengaged position while the other of said members is a multiple exposure member cooperating with said blocking means for displacing the latter to said blocking position when said multiple exposure member is moved by the operator, said multiple exposure member cooperating with said rewind member for automatically displacing the latter to locate said clutch means in said disengaged position thereof when said multiple exposure member is moved by the operator while said rewind member is movable by the operator independently of said multiple exposure member so that only said rewind member is moved when said manually operable means is in said rewind position thereof while both of said members are moved when said manually operable means is in said multiple exposure position thereof.

4. The combination of claim 3 and wherein a retaining means cooperates with said rewind member and said clutch means for releasably retaining said clutch means in said disengaged position thereof when said manually operable means is displaced from said rest position thereof to said rewind position thereof, and said multiple exposure member cooperating with said retaining means for preventing the latter from assuming a position retaining said clutch means in said disengaged position thereof when said multiple exposure member is moved by the operator to place said manually operable means in said multiple exposure position thereof.

5. The combination of claim 4 and wherein said transmission means cooperates with said retaining means for displacing the latter away from a retaining position, thus permitting said clutch means to resume its engaged position, after said manually operable means has been placed in said rewind position and said transmission means is operated to resume transporting of film through said film-transporting means.

6. The combination of claim 1 and wherein said transmission means includes a rotary shaft and said take-up spool means has a hollow interior in which said shaft is located, said connecting means including an inner surface portion of said take-up spool means and an outer surface portion of said shaft frictionally engaging each other.

7. In a camera, film-transporting means, transmission means for transmitting movement to said film-transporting means, clutch means operatively connected between said transmission means and film-transporting means and having an engaged position for transmitting movement between said transmission means and film-transporting means and a disengaged position for preventing transmission of movement from said transmission means to said film-transporting means, take-up spool means for taking up exposed film, connecting means connecting said transmission means to said spool means for turning the latter except when said spool means is blocked against movement, blocking means having a non-blocking position freeing said spool means to be turned by said transmission means and a blocking position engaging said spool means to block the latter against movement when said transmission means operates, and manually operable means having a rest position at which said blocking means is in said non-blocking position thereof and said clutch means is in said engaged position thereof, said manually operable means having a rewind position cooperating with said clutch means for placing the latter in said disengaged position thereof while said blocking means still remains in said non-blocking position thereof, and said manually operable means having a multiple exposure position cooperating both with said blocking means and said clutch means for placing said blocking means in said blocking position thereof and said clutch means in said disengaged position thereof so that in said multiple exposure position of said manually operable means said transmission means may be operated simultaneously with cocking of a shutter of the camera without transporting film while when said manually operable means is in said rewind position thereof film may be rewound from said take-up spool back into a film cartridge, said manually operable means including a pair of manually engageable members accessible to the operator for manual movement, one of said members being a rewind member operatively connected with said clutch means for displacing the latter from said engaged to said disengaged position while the other of said members is a multiple exposure member cooperating with said blocking means for displacing the latter to said blocking position when said multiple exposure member is moved by the operator, said multiple exposure member cooperating with said rewind member for automatically displacing the latter to locate said clutch means in said disengaged position thereof when said multiple exposure member is moved by the operator while said rewind member is movable by the operator independently of said multiple exposure member so that only said rewind member is moved from said manually operable means is in said rewind position thereof while both of said members are moved when said manually operable means is in said multiple exposure position thereof, a retaining means cooperating with said rewind member and said clutch means for releasably retaining said clutch means in said disengaged position thereof when said manually operable means is displaced from said rest position thereof to said rewind position thereof, and said multiple exposure member cooperating with said retaining means for preventing the latter from assuming a position retaining said clutch means in said disengaged position thereof when said multiple exposure member is moved by the operator to place said manually operable means in said multiple exposure position thereof, said transmission means cooperating with said retaining means for displacing the latter away from a retaining position, thus permitting said clutch means to resume its engaged position, after said manually operable means has been placed in said rewind position and said transmission means is operated to resume transporting of film through said film-transporting means, a safety means cooperating with said multiple exposure member for preventing movement thereof to displace said blocking means from said non-blocking to said blocking position thereof except when said transmission means has completed an operating cycle during which a complete film frame has been moved, a support means toward which said multiple exposure member is moved to displace said blocking means from said non-blocking to said blocking position thereof, said safety means including a plate movably carried by said support means and normally situated in a safety position between said support means and multiple exposure member to prevent movement thereof, said transmission means including a cam means for engaging said plate and displacing the latter away from said safety position to a release position where it is not located between said multiple exposure member and said support means only upon completion of an operating cycle of said transmission means, so that except when a complete film frame has been moved said plate prevents actuation of said multiple exposure member by the operator at least to an extent sufficient to locate said blocking means in said blocking position thereof.

8. The combination of claim 7 and wherein a pin is situated between said plate and said support means to prevent deflection of said plate excessively by the operator when the operator attempts to move said multiple exposure member to place said blocking means in said blocking position thereof at a time other than when a complete film frame has been moved by said transmission means.

9. In a camera, film-transporting means, transmission means for transmitting movement to said film-transporting means, clutch means operatively connected between said transmission means and film-transporting means and having an engaged position for transmitting movement between said transmission means and film-transporting means and a disengaged position for preventing transmission of movement from said transmission means to said film-transporting means, take-up spool means for taking up exposed film, connecting means connecting said transmission means to said spool means for turning the latter except when said spool means is blocked against movement, blocking means having a non-blocking position freeing said spool means to be turned by said transmission means and a blocking position engaging said spool means to block the latter against movement when said transmission means operates, and manually operable means having a rest position at which said blocking means is in said non-blocking position thereof and said clutch means is in said engaged position thereof, said manually operable means having a rewind position cooperating with said clutch means for placing the latter in said disengaged position thereof while said blocking means still remains in said non-blocking position thereof, and said manually operable means having a multiple exposure position cooperating both with said blocking means and said clutch means for placing said blocking means in said blocking position thereof and said clutch means in said disengaged position thereof so that in said multiple exposure position of said manually operable means said transmission means may be operated simultaneously with cocking of a shutter of the camera without transporting the film while when said manually operable means is in said rewind position thereof film may be rewound from said take-up spool back into a film cartridge, said transmission means acting through said clutch means, when the latter is engaged, on said film-transporting means for transporting film frame-by-frame during successive operating cycles of said transmission means, respectively, and safety means cooperating with said manually operable means for preventing the latter from assuming said multiple exposure position except at the end of one complete operating cycle of said transmission means when transportation of a complete frame has been completed and the next operating cycle for transporting the next film frame has not yet started, a support means toward which said manually operable means is moved for assuming said multiple exposure position, said safety means including a plate normally situated between said support means and said manually operable means for preventing movement of the latter to said multiple exposure position, and said transmission means including a cam means which acts on said plate for situating the latter at a release position where it is no longer situated between said manually operable means and said support means only when said transmission means has completed an operating cycle and has not yet started the next operating cycle, so that only at the latter time can said manually operable means be placed in said multiple exposure position thereof.

* * * * *